Figure 1:
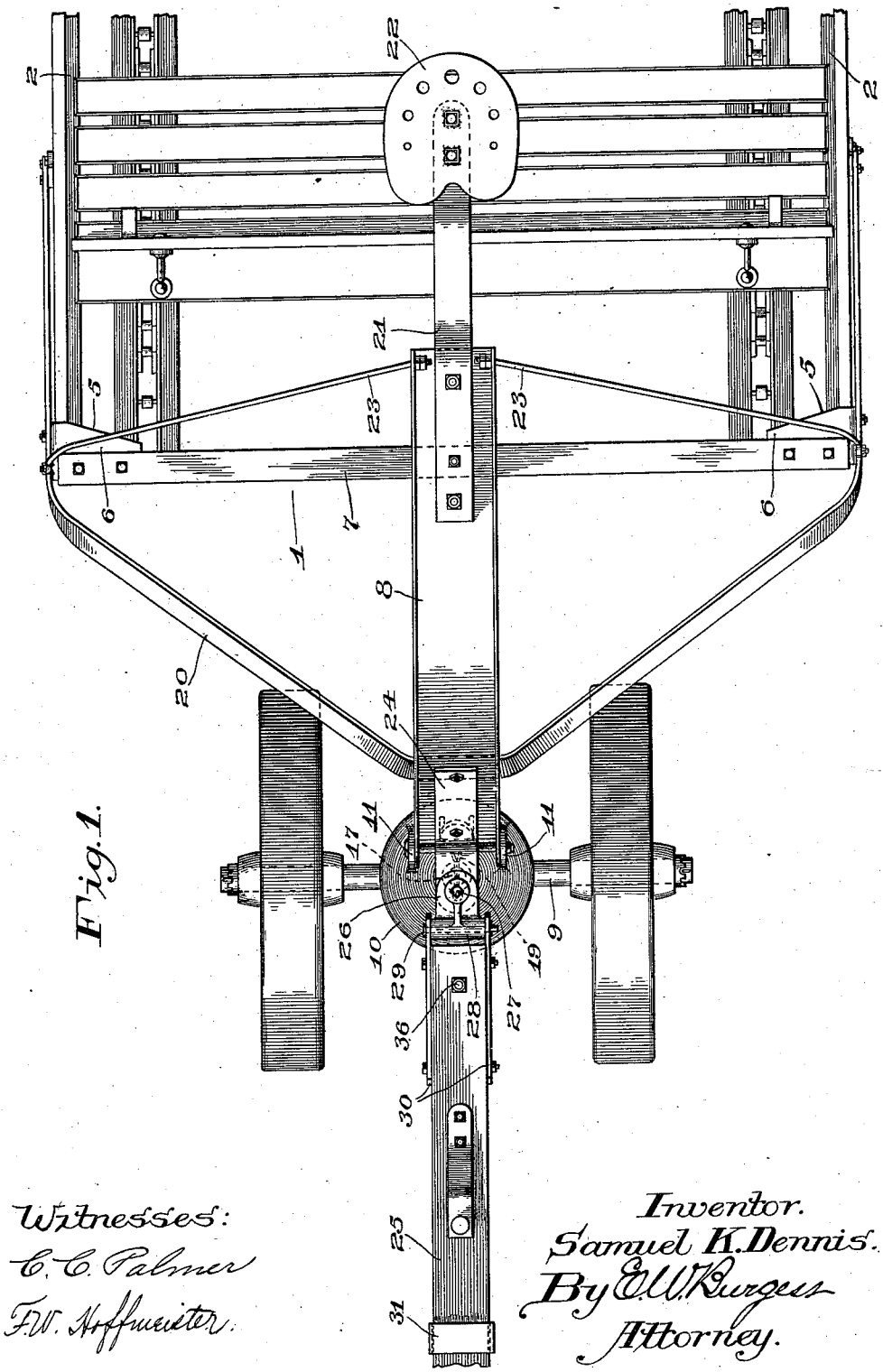

S. K. DENNIS.
FRONT WHEELED TRUCK FOR VEHICLES.
APPLICATION FILED OCT. 20, 1911.

1,014,209.

Patented Jan. 9, 1912.
2 SHEETS—SHEET 1.

Witnesses:
C. C. Palmer
F. W. Hoffmeister

Inventor.
Samuel K. Dennis.
By E. W. Burgess
Attorney.

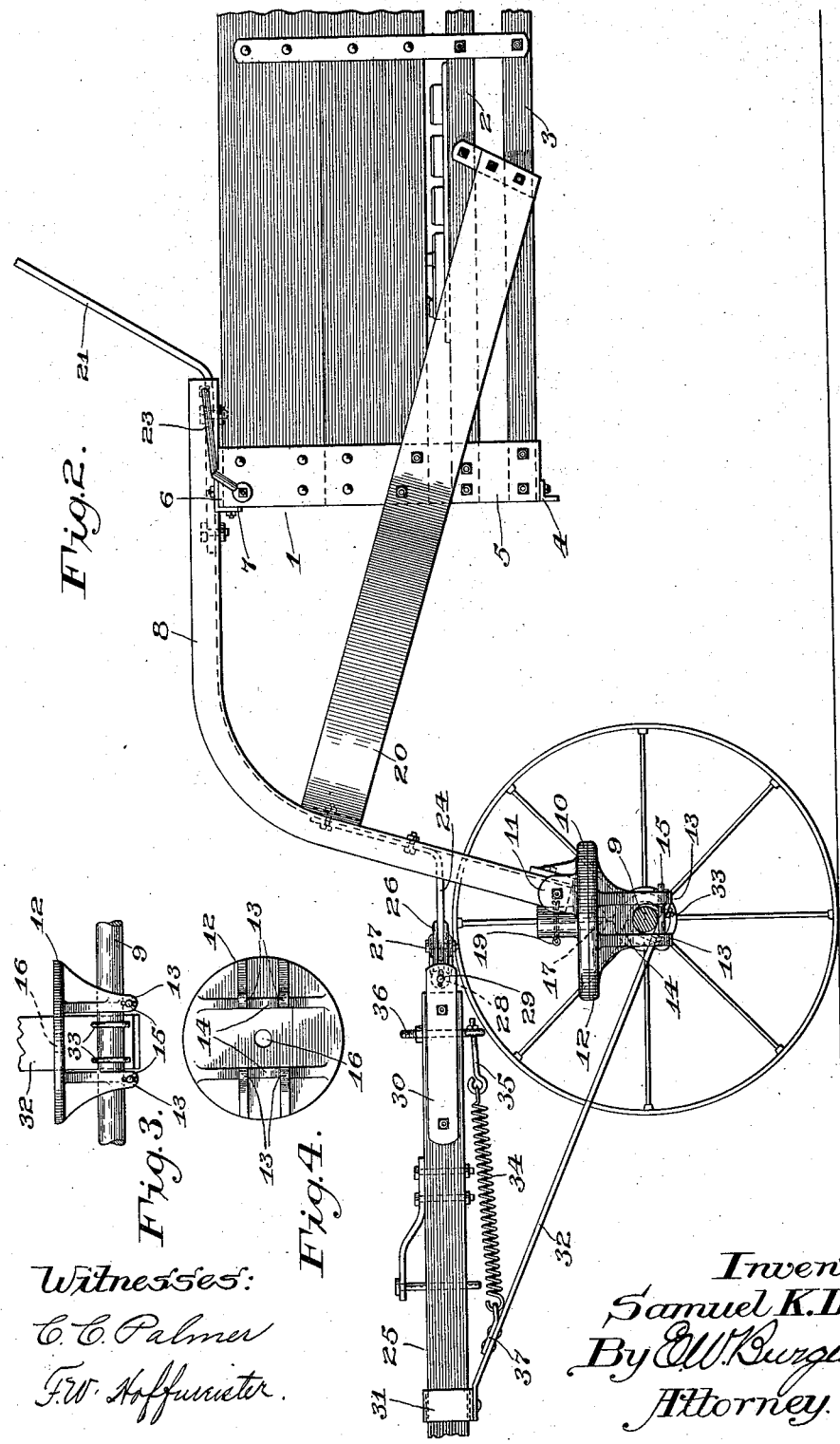

UNITED STATES PATENT OFFICE.

SAMUEL K. DENNIS, OF CHICAGO, ILLINOIS, ASSIGNOR TO INTERNATIONAL HARVESTER COMPANY, A CORPORATION OF NEW JERSEY.

FRONT-WHEELED TRUCK FOR VEHICLES.

1,014,209.

Specification of Letters Patent.

Patented Jan. 9, 1912.

Application filed October 20, 1911. Serial No. 655,712.

*To all whom it may concern:*

Be it known that I, SAMUEL K. DENNIS, a citizen of the United States, residing at Chicago, in the county of Cook and State of Illinois, have invented certain new and useful Improvements in Front-Wheeled Trucks for Vehicles, of which the following is a specification.

My invention relates to wheeled trucks generally, and in its particular adaptation is designed for use in connection with manure spreaders wherein the receptacle for the manure is carried at a low elevation for convenience in loading, and it consists in certain structural details that form a strong and rigid support for the front end of the receptacle, that projects in front thereof and is connected with the truck axle member in a manner permitting the truck to turn freely without contacting with the receptacle; the object of my invention being to provide a simple and strong truck frame and draft connections that may be attached to a vehicle body when it is desired to carry the latter at a low elevation. This object is attained by means of the mechanism illustrated by the accompanying drawings, in which—

Figure 1 represents a top plan view of the front end of a manure spreader having my improved truck frame and draft connections forming a part thereof; Fig. 2 is a side elevation of Fig. 1, having the truck axle shown in cross section and one of the truck wheels removed; Fig. 3 is a detached detail illustrating the manner of connecting the truck axle with one of the members of the truck frame; and Fig. 4 is a bottom view of the truck axle plate forming a part of the mechanism as shown in Fig. 3.

The same reference numerals designate like parts throughout the several views.

1 represents the front portion of a manure spreader, the bed frame of its receptacle being constructed of steel and including upper and lower sill members 2 and 3, respectively, upon opposite sides of the receptacle and having the front ends of members 3 connected by means of a transverse bar 4.

5 represents vertically arranged bars having their lower ends secured to the front ends of the sill members 2 and 3 upon opposite sides of the receptacle, their body portions to the side walls of the receptacle, and having their upper ends turned inward in a manner forming horizontally arranged bracket members 6, to which are secured the opposite ends of a transverse bar 7, and 8 represents a truck bolster member, preferably of channel form, having its rear end secured to the middle portion of member 7 and the body portion thereof extending forward and downward, forming a depending curved leg to which is attached a truck axle 9, by means of a circular plate 10, having ear portions 11 integral therewith and by means of which the plate is secured to the lower end of said leg.

12 represents a circular plate having depending leg portions 13 that are provided with saddle portions 14 that receive the axle 9, pins 15 passing through openings in the ears and below the axle and operative to retain the plate upon the axle. The plate 12 is provided with a central opening 16, and 17 represents a king bolt received by the opening and extending upward is received by an opening in plate 10 that is continued through a vertically arranged cylindrical boss and is secured therein by means of a pin 19.

20 represents a U-shaped frame member having its central portion secured to the bolster member 8 and its side members inclined outward, rearward and downward and then downward and directly rearward and having the rear ends thereof secured to sill members 2 and 3 upon opposite sides of the receptacle, and also to the vertical bars 5.

21 represents a seat supporting bar having its lower end secured to the rear end of member 8, and having a seat 22 secured to its upper end, and 23 represents truss members having the outer ends thereof secured to the upper ends of the vertical member 5 and inclining inward and rearward, have their inner ends connected with the side walls of the member 8 at its rear end.

24 represents a draft member having an upwardly and rearwardly inclined portion whereby it is secured to the leg portion of member 8, and a forwardly extending horizontal portion whereby it is pivotally connected with the rear end of a draft tongue member 25 by means of a clevis member 26 and a bolt 27 in a manner permitting the tongue to swing laterally relative to the truck supporting frame. The clevis member is provided with a horizontally arranged transverse barrel portion 28 that receives a cross pin 29 whereby it is pivotally connected with the rear ends of strap members 30 that are secured to opposite sides of the rear end of the draft tongue.

31 represents a yoke that is slidably mounted upon the draft tongue, 32 a truck controlling bar having its front end secured to the yoke and inclining downward and rearward has its rear end secured to the truck axle between the depending legs 13 of plate 12, by means of U-bolts 33, the bar being operative to turn the truck axle about its vertical pivot upon the frame as the draft tongue swings laterally, and to rock the axle in the saddle portions of plate 12 as the draft tongue rises and falls at its front end, the slidable yoke permitting the latter movement.

34 represents a counterbalancing spring having its rear end adjustably connected by means of a link 35 to the eye of a bolt 36 passing through the tongue, and its front end secured, by means of a clip 37, to the upper front end of the bar 32, the spring being operative to yieldingly sustain the draft tongue in a raised position.

What I claim as my invention, and desire to secure by Letters Patent, is:

1. A fore truck for manure spreaders including, in combination, a receptacle having longitudinally arranged base sill members upon opposite sides thereof, vertically arranged bars having their lower ends secured to the front ends of said base sill members, a transverse bar having opposite ends thereof secured to the upper ends of said vertical bars, a truck bolster member having its rear end secured to the central portion of said transverse bar and curving forward and downward and terminating in a leg portion having the lower end thereof pivotally connected with a truck axle, a U-shaped truck frame member having its central portion secured to said bolster member and the side members thereof extending outward, downward and rearward and secured to said vertical bars and said base sill members.

2. A fore truck for manure spreaders including, in combination, a receptacle having longitudinally arranged base sill members upon opposite sides thereof, vertically arranged bars having their lower ends secured to the front ends of said base sill members and their upper ends turned inward, a transverse bar having opposite ends thereof secured to the inwardly turned ends of said vertical bars, a truck bolster member having its rear end secured to the central portion of said transverse bar and curving forward and downward and terminating in a leg portion, the lower end thereof being pivotally connected with a truck axle, truss members having one end thereof secured to the upper ends of said vertical bars, and inclined inward and rearward have their opposite ends secured to the rear end of said bolster member, a U-shaped truck frame member having its central portion secured to said bolster member and the side members thereof extending outward, downward and rearward and secured to said vertical bars and said base sill members.

SAMUEL K. DENNIS.

Witnesses:
M. VAN DER VLIET,
EVAN EVANS.

Copies of this patent may be obtained for five cents each, by addressing the "Commissioner of Patents, Washington, D. C."